May 20, 1952 K. A. WEBER 2,597,416
MACHINE FOR GRINDING EDGES OF GLASS PLATES
Filed Oct. 22, 1948 4 Sheets-Sheet 2

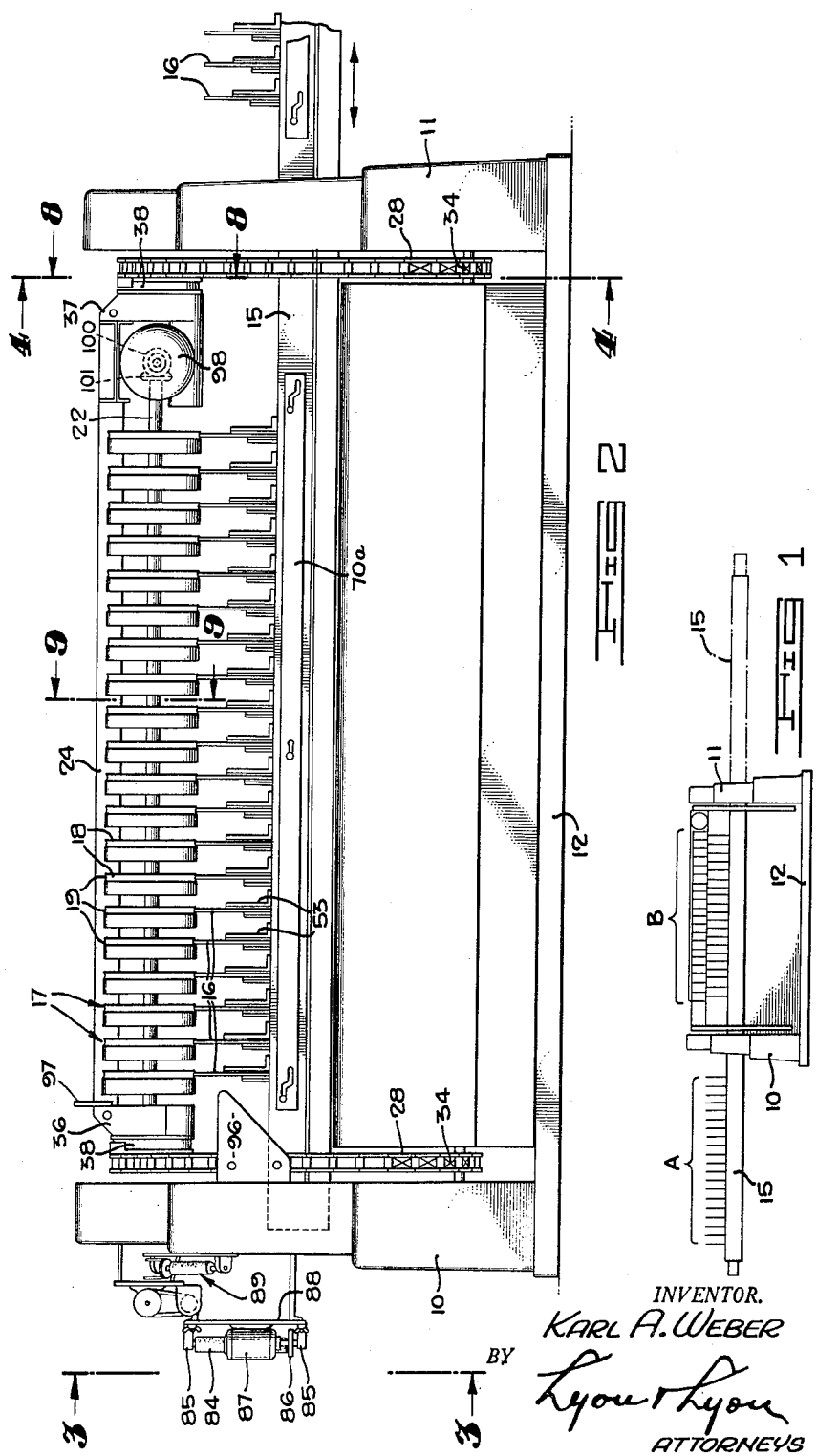

INVENTOR.
KARL A. WEBER
BY
Lyon & Lyon
ATTORNEYS

May 20, 1952 K. A. WEBER 2,597,416
MACHINE FOR GRINDING EDGES OF GLASS PLATES
Filed Oct. 22, 1948 4 Sheets-Sheet 3

INVENTOR.
KARL A. WEBER
BY
ATTORNEYS

May 20, 1952 K. A. WEBER 2,597,416
MACHINE FOR GRINDING EDGES OF GLASS PLATES
Filed Oct. 22, 1948 4 Sheets-Sheet 4
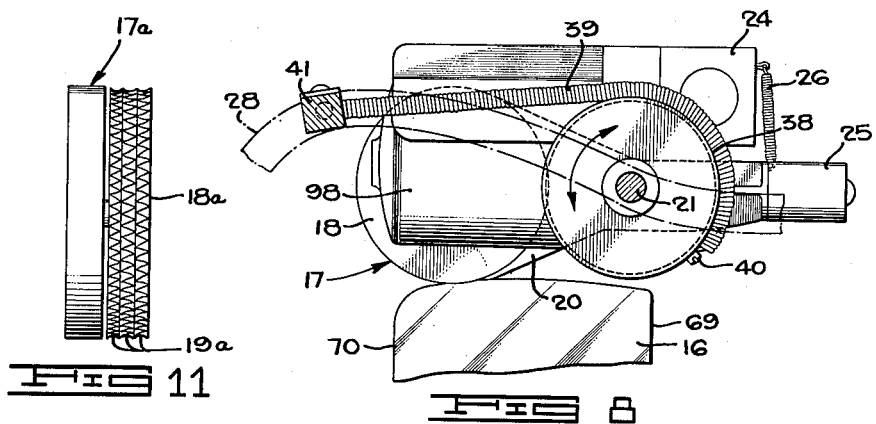
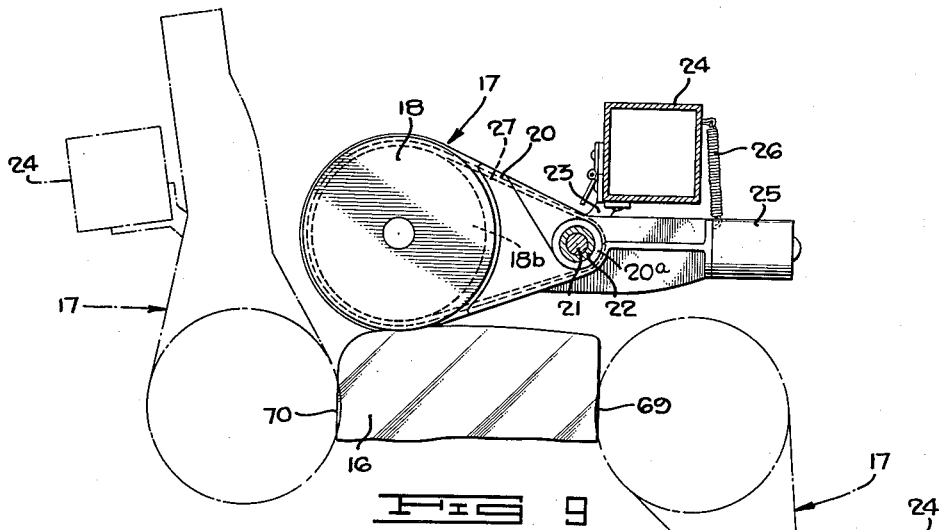
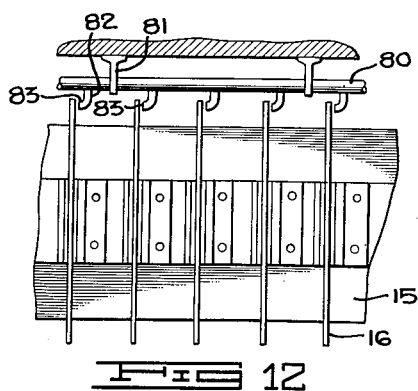
INVENTOR.
KARL A. WEBER
BY
ATTORNEYS

UNITED STATES PATENT OFFICE 2,597,416

MACHINE FOR GRINDING EDGES OF GLASS PLATES

Karl A. Weber, Brentwood Heights, Calif., assignor to Weber Showcase & Fixture Co., Inc., Los Angeles, Calif., a corporation of Delaware Application October 22, 1948, Serial No. 55,927

13 Claims. (Cl. 51—32)

This invention relates to glass grinding apparatus and is particularly directed to a machine for rounding the edges of panes of glass such as are used in the windows of automotive vehicle bodies, and relates to improvements over the type of apparatus disclosed in my prior Patent No. 2,057,174, issued October 13, 1936, for a Glass Grinding Machine.

In accordance with this invention, I provide a plurality of power driven grinding wheels on a movable support which are adapted simultaneously to process the edges of a group of panes of glass so that a rounded edge is formed on more than one side of each pane. Several groups of glass panes are removably mounted on a single carriage so that while the grinding wheels are rounding the edges of the panes in one group, another group is located in an accessible position for loading or unloading and for additional processing if desired.

An important object of this invention is to provide a machine for rounding the edges of glass panes or the like which utilizes a carriage adapted to bring one of a number of groups of panes into position for grinding while another group is accessible for loading and unloading.

Another object is to provide means for removing excess plastic binder of laminated "safety" glass as the carriage moves along the base of the machine.

Another object is to provide a device of this type in which the path of travel of the grinder wheels may be easily changed to accommodate glass panes of various lengths.

A further object is to provide means whereby identifying indicia may be applied to the individual panes in one group while another group is being acted upon by the grinding wheels.

Other objects and advantages will appear hereinafter.

In the drawings:

Figure 1 is a side elevation showing an outline of a preferred embodiment of my invention.

Figure 2 is a similar view on an enlarged scale showing the grinding wheel assembly positioned between the end frames of the machine.

Figure 5 is a side elevation partly broken away showing one form of mechanism for reciprocating the carriage and for moving the support for the grinding wheels.

Figure 6 is a sectional detail of a portion of the carriage showing the releasable clamping apparatus for the glass panes.

Figure 7 is a partial sectional elevation taken substantially on the lines 7—7 as shown in Figure 6.

Figure 8 is a partial sectional elevation taken substantially on the lines 8—8 as shown in Figure 2.

Figure 9 is a similar view taken substantially on the lines 9—9 as shown in Figure 2 and illustrating in dotted lines the positions taken by the grinder wheel assembly on the various sides of the individual glass panes.

Figure 11 is a side elevation of a modified form of grinding wheel having a plurality of edge grinding grooves.

Figure 12 is a plan view showing sand blast apparatus for cutting identifying indicia in each of the panes in loading position.

Figure 3:
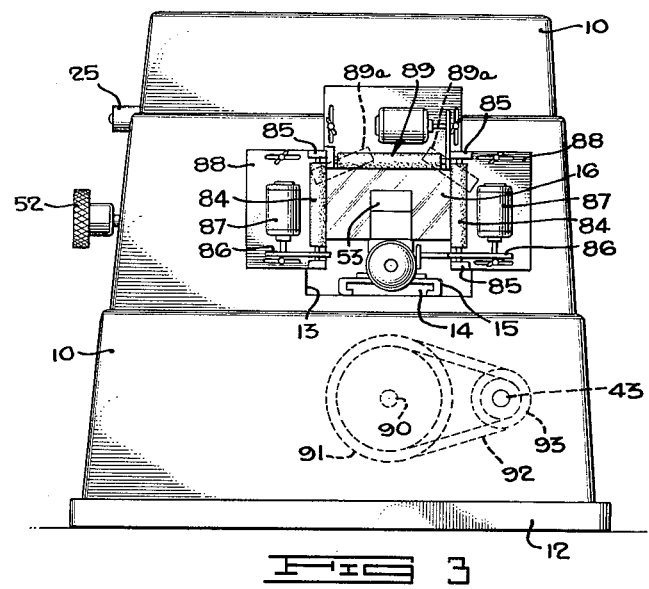
Figure 3 is an end view taken substantially in the direction 3—3 as shown in Figure 2.

Referring to the drawings, a pair of end frames 10 and 11 are mounted on a base 12 in spaced relationship, and each of the end frames is provided with a central opening 13. A horizontal guide member 14 is supported on the base and extends between the end frames 10 and 11, and a carriage 15 is slidably mounted for longitudinal reciprocation on the guide member 14. A plurality of panes of glass 16 may be secured at spaced intervals to the carriage, and upon longitudinal movement of the carriage 15 on the guide member 14 are adapted to pass through the openings 13 in the end frames 10 and 11. As shown in Figure 1 one group of panes identified as group A is positioned in an exposed location, while another group identified as B is located between the end frames 10 and 11.

A plurality of grinding wheels 17 are adapted to round the exposed edges of the individual panes 16. Each of these grinding wheel assemblies 17 includes an abrasive disk 18 provided with at least one peripheral groove 19 and rotatably mounted on a swinging body 20. Each of the bodies 20 is pivotally supported on the sleeve 22 which surrounds the longitudinal bar 21. The sleeve 22 is rotatably mounted in brackets 23 fixed on a longitudinal support 24. A counterweight 25 may be provided on each of the bodies 20, and a spring 26 acts to pivot the body 20 in a direction to bring the abrasive wheel 18 into contact with one of the glass panes 16. Each of the bodies 20 is provided with a driving pulley 20a fixed to the sleeve 22 and adapted to drive a driven pulley 18b concentric with the abrasive wheel 18 by means of the V-belt 27. From this description it will be understood that rotation of the sleeve 22 serves to rotate each of the abrasive wheels 18.

Figure 4:
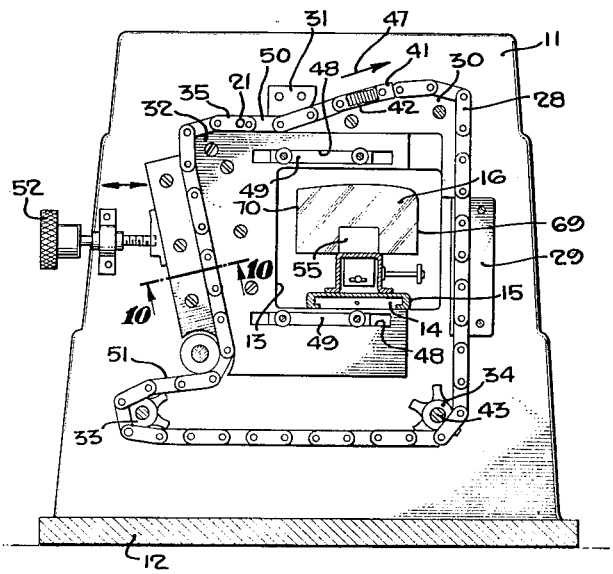
Figure 4 is a sectional elevation taken substantially on the lines 4—4 as shown in Figure 2.
Figure 10:
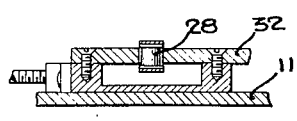
Figure 10 is a sectional detail taken substantially on the lines 10—10 as shown in Figure 4.

The longitudinal support 24 is mounted for movement relative to the end frames 10 and 11 in order that the grinding wheel assemblies 17 may be progressed along the exposed edges of the glass panes. As best shown in Figure 4 the means for moving the longitudinal member 24 through the desired path preferably comprises an endless chain 28 mounted adjacent each of the end frames 10 and 11 and constrained to travel through a desired path by means of suitable guides disposed to contact the links of the chain. These guides include the vertical slotted member 29, the curved guide 30, the upper guide 31 and the adjustable guide 32. An idler sprocket 33 and a driving sprocket 34 are rotatably mounted on each of the end frames and engage the links of the chain 28.

Opposite ends of the longitudinal bar 21 are carried on links 35 of the endless chain 28. Brackets 36 and 37 are fixed at opposed ends of the longitudinal support member 24, and these brackets are provided with curved portions 38 around which a tension spring 39 is trained. One end of the spring 39 is fixed to the bracket 36, 37 by means of the attachment fitting 40, and the other end of each tension spring 39 is fixed to a lug 41 carried on a link 42 of the endless chains 28. The drive sprockets 34 are mounted on a common drive shaft 43 extending between the end frames 10 and 11. This drive shaft 43 is driven from a motor 44 by way of reduction gear 45 and transmission connections 46 positioned within the pedestal or end frame 10. When the driving sprockets 34 are rotated the chain 28 travels along its path as guided by the members 29, 30, 31, 32 and sprockets 33 and 34. This motion of the chains moves the longitudinal bar 21 and longitudinal support member 24 along the path of the chain links.

As the longitudinal member is progressed through this path of travel the individual grinder units 17 are carried with it, and each of the abrasive wheels 18 travels along the edges of its respective glass pane 16. As shown in Figure 9 the grinder assemblies 17 pass upwardly along the left vertical edge of the pane 16, then move along the curved upper edge thereof and finally move downwardly along the right vertical edge thereof, so that the exposed edges of the pane are continuously ground by the abrasive wheel 18. A complete cycle for grinding each of the panes preferably comprises movement of the grinder assemblies 17 from the dotted line position at the left side of the drawing to the other dotted line position and return. This is accomplished by causing the driving motor 44 to move the chain in the direction shown by the arrow 47 in Figure 4 and then reversing the direction of motion by reversing the direction of rotation of the motor 44 to return the chain links to their initial position.

The adjustable guide 32 is provided with parallel slots 48 which receive stationary guide bars 49 in sliding relation. The guide bars 49 are mounted on the end frames 10 and 11. The slots 48 are parallel to the substantially horizontal flights or sections of the chain identified as 50 and 51. An adjusting screw 52 is provided for moving the guide 32 relative to the guide bars 49. When the adjustable guide 32 is moved in one direction the length of the upper flight 35 is shortened and the lower flight 51 is lengthened; when the adjustable guide is moved in the other direction the upper flight 35 is lengthened and the lower flight 51 is shortened. By this means the path of travel of the chain links is variable without imposing the requirement of an idler to take up slack.

The individual panes 16 are mounted on the carriage 15 and are releasably secured thereto by means of suitable clamping apparatus. As best shown in Figure 6 a plurality of angle brackets 53 may be secured to the carriage 15 at longitudinally spaced intervals and provided with facing 54 for contact with the individual panes 16. A plurality of clamps 55 are mounted on pivot pins 56 which are supported on the carriage. The clamps 55 for the panes in group A are operated by a common actuator, and similarly the clamps for the panes in group B are actuated by a separate actuator. As shown each of these actuators comprises a longitudinal rod 57 arranged to pass through apertures 58 in each of the clamps 55. A separate coil spring 59 is provided for each of the clamps, and one end of each spring is fixed to the bar 57 by means of a cross-pin 60 while the other end of the spring acts against the lower portion of its respective clamp 55. A power cylinder assembly 61 is provided for actuating each of the bars 57. Movement of the bar 57 to the left as shown in Figure 6 causes release pins 62 carried by the bar 57 to engage the lower ends of the clamps 55 so that the facing 63 on each clamp is moved away from its respective pane 16.

Movement of the actuator rod 57 toward the right allows the individual coil springs 59 to actuate the clamps toward operative position. It will be observed that minor variations in thickness of the individual panes 16 will not adversely affect the clamping action on that or other panes because the coil springs 59 compensate for such variations in thickness. Suitable hydraulic or pneumatic connections 64 and 65 are provided for actuating the piston 66 within the assembly 61. While I have shown piston and cylinder means for actuating the rod 57, it is recognized that mechanical means or electrical means may be employed with good results. The limits of movement of the rod 57 with respect to the carriage 15 may be fixed by means of a stop pin 67 on the rod 57 moving within a slot 68 provided on the carriage.

The individual panes 16 are preferably clamped in position on the carriage 15 with their forward edges 69 placed in vertical alignment. This may be conveniently accomplished through the use of an alignment bar 70a mounted on the carriage 15 and adapted to be moved upwardly when desired to provide a stop for the forward edge 69 for each of the panes 16. The rearward edge 70 of each pane 16 will be positioned in alignment with the rearward edges on each of the other panes for any one size of pane. Longer panes can be accommodated by adjusting the screw 52 to move the guide 32 in a rearward direction, that is, toward the left as viewed in Figure 4. Panes of greater or lesser height may be accommodated by changing the dimensions of the clamping apparatus on the carriage 15.

Means are provided for moving the carriage 15 longitudinally on the guide 16 through the central openings 13 provided in the end frames 10 and 11. As shown in the drawings, this means includes a reversible driving motor 72 having a built-in reduction gear 73. The motor 72 drives the countershaft 74 by way of the belt 75 and the countershaft turns a spooling drum 76. A flexible cable 77 has one or more loops which pass around the spooling drum 76, and the ends of the cable are secured to the carriage as shown at 78. Pulleys 79 guide the cable from the spooling drum into position with respect to the carriage 15. It is recognized that any other convenient or desirable form of drive for reciprocating the carriage may be employed.

When the carriage moves from one end of its stroke to the other the panes in group A move from the exposed position shown in Figure 1 to an operative position between the end frames 10 and 11 and adjacent the grinder wheel assemblies 17. At the same time the panes in group B are moved to the position shown in dotted lines at the right side of the end frame 11 as shown in Figure 1. Thus the dotted line position of the carriage shows the loading position for group B, while the solid lines show the loading position for group A.

As shown in Figure 12, sand blast means may be provided for marking each of the panes 16 with identifying indicia such as, for example, the trademark of the glass manufacturer. This sand blasting operation may be readily accomplished prior to or following the rounding of the exposed edges of the panes by the edge treating apparatus or grinders 17. A header pipe 80 supported by brackets 81 for turning movement about the axis of the pipe may be provided with individual branch nozzles 82 for each of the panes in the group. The outlet end 83 of each nozzle is directed toward a side face of one of the panes 16. In practice I prefer to apply a stencil (not shown) to the pane of glass immediately in advance of the sand blast nozzle. This sand blasting operation for marking the panes with identifying indicia takes place while the edge finishing operation is underway, so that there is no loss of time for this operation. The sand blasting may be accomplished either at the time of loading the individual panes onto the carriage 15 or may occur after the panes have been ground and prior to unloading. When the sand blast operation is complete the header pipe 80 is turned within the brackets 81 to swing the nozzles 82 to an inoperative position.

Safety glass of the type used in automobile body windows commonly is of laminated form with a layer of plastic material between layers of glass. When the individual panes of glass are received from the source of manufacture their edges are often coated with excess plastic material which is detrimental to the proper operation of the abrasive grinding wheels 18. In order to remove this excess plastic material, I prefer to provide a plurality of rotary brush members 84 which are rotatably mounted in a position to contact the exposed edges of each of the panes 16. Each of the brushes 84 may be carried on suitable bearings 85 and driven by means of a belt drive 86 from an individual driving motor 87. Each of the brushes 84, together with the driving motor 87, may be mounted on an individual plate 88 adjustably mounted on one of the end frames by means of suitable brackets (not shown). I prefer to employ several power driven brush units generally designated 89 in order to contact the full length of the exposed edges of the panes which are to be rounded. Thus, I prefer to employ a pair of vertical brushes, a horizontal brush for the upper curved edge of the panes, and a pair of inclined brushes generally designated 89a and shown in dotted lines on Figure 3. While I have shown the brush assemblies only on the end frame 10, it is to be understood that a similar group of brush assemblies is to be mounted on the end frame 11.

In operation the grinder wheel assemblies 17 operate on the edges of the individual panes 16 in one group, while the panes in the other group are in an exposed location for loading, unloading and sand blasting if desired. The reversible driving motor 44 causes the endless chains 28 to move through a predetermined path on each of the end frames 10 and 11. The longitudinal support 24 which is pivotally carried on links of the chain 28 is thus caused to pass through a path of movement carrying the grinder wheel assemblies with it so that the abrasive wheel 18 of each assembly rounds the three exposed edges of each of the panes 16. As explained in my prior patent identified above, it is important that the rate of linear movement of the grinding wheels with respect to the edges of the panes be maintained substantially constant in order to provide a uniform rounding treatment for the panes. This feature requires that the rate of movement of the chain 28 be nonuniform so that the chain may move at a faster rate while the grinding wheels are passing over the corners where two of the edges join. In order to produce this nonuniform rate of movement of the chain, I provide a timing shaft 90 driven from a pulley 91 which is connected to the pulley 93 on shaft 43 by means of the belt 92. Suitable trip fingers 94 are mounted on the timing shaft 90 and are adapted to contact switch fingers 95 to cause the desired variations in the rate of speed of the driving motor 44. Furthermore, these switch fingers 94 coact with certain of the switch fingers 95 to reverse the direction of rotation of the driving motor 44 when the grinding wheel assemblies reach one end of their path of travel. These switch fingers also act to interrupt the power supply to the motor 44 when the grinder assemblies 17 return to their initial position and swing outwardly away from the rearward edge 70 of the glass panes 16. This swinging movement of the grinder wheel assemblies 17 away from the pane 16 is accomplished by providing a fixed abutment 96 as shown in Figure 2. A finger 97 on the longitudinal support 24 strikes this abutment 96 and pivots the bar 24 together with each of the assemblies 17 to an inoperative position.

A motor 98 is carried on the longitudinal support member 24 at one end thereof and is arranged to drive the longitudinal sleeve 22 through suitable gearing comprising driving gear 100 and driven gear 101. From this description it will be understood that the motor 98 supplies power for turning all of the grinder wheels 18 simultaneously.

When the rounding of the exposed edges of the pane 16 has been completed by the grinder wheel assemblies, the motor 72 is energized to cause the carriage 15 to move longitudinally on the base 12 to move the completed group of panes to an accessible location while at the same time bringing the other group of panes into operative position between the end frames 10 and 11. The driving motors 87 for the brush assemblies 89 are caused to rotate simultaneously with the motor 72 so that the brush members 84 are rotating only while the carriage 15 is in motion.

In the modified form of my invention shown in Figure 11 each of the grinding wheel assemblies 17a is provided with an abrasive wheel 18a having a plurality of grooves 19a.

Having fully described my invention, it is to be understood that I do not wish to be limited to the details herein set forth, but my invention is of the full scope of the appended claims.

I claim:

1. In a device for rounding the edges of a plurality of panes of glass or the like, the combination of a base; a carriage mounted for longitudinal reciprocable movement on the base; means on the carriage for supporting a plurality of groups of panes; a plurality of edge-treating assemblies; common means for supporting said assemblies on the base and for progressing them in a curved path along exposed edges of the panes, said common means defining an opening; and means for moving the carriage along the base through the opening to bring one group of panes into operative position adjacent the edge-treating assemblies while moving another group of panes away from such position.

2. In a device for rounding the edges of a plurality of panes of glass or the like, the combination of a base; a carriage mounted for reciprocation on the base; releasable means on the carriage for supporting two groups of panes, each pane being supported at right angles to the direction of travel of the carriage; a plurality of edge-treating assemblies; common means for supporting said assemblies on the base and for progressing them in a curved path along exposed edges of the panes, said common means defining an opening; and means for moving the carriage along the base through the opening to bring one group of panes into operative position adjacent the edge-treating assemblies while moving the other group of panes away from such position.

3. In a device for rounding the edges of a plurality of panes of glass or the like, the combination of a base; a carriage mounted for longitudinal movement on the base; releasable means on the carriage for supporting a group of panes at an angle to the direction of travel of the carriage, and in longitudinally spaced relationship; a plurality of grinder wheel assemblies, each adapted to operate on one of said panes; common means for supporting said assemblies and for progressing them along exposed edges of the panes, said common means including an endless flexible element defining an opening; and means for moving the carriage on the base through the opening to bring the group of panes into operative position adjacent the grinder wheel assemblies or for moving it away from such position, as desired.

4. In a device for rounding the edges of a plurality of panes of glass or the like, the combination of a base; a pair of end frames on the base, each having a central opening; a carriage mounted for longitudinal movement on the base and adapted to move through said openings; releasable means on the carriage for supporting a group of panes at an angle to the direction of travel of the carriage, and in longitudinally spaced relationship; a plurality of grinder wheel assemblies, each adapted to operate on one of said panes; common means for supporting said assemblies between said end frames and for progressing them along exposed edges of the panes, said common means including an endless flexible element defining an opening; and means for moving the carriage on the base through the opening to bring the group of panes into operative position adjacent the grinder wheel assemblies or for moving it away from such position, as desired.

5. In a device for rounding the edges of a plurality of panes of glass or the like, the combination of a base; a pair of end frames on the base, each having a central opening; a carriage mounted for reciprocation on the base and adapted to move through said openings; releasable means on the carriage for supporting two groups of panes; each pane being supported at an angle to the direction of travel of the carriage; a plurality of edge-treating assemblies; common means for supporting said assemblies on the end frames and for progressing them in a curved path along exposed edges of the panes; and means for moving the carriage along the base to bring one group of panes into operative position adjacent the edge-treating assemblies while moving the other group of panes away from such position.

6. In a device for rounding the edges of a plurality of panes of glass or the like, the combination of a base; a pair of end frames on the base, each having a central opening; a carriage mounted for reciprocation on the base and adapted to move through said openings; means on the carriage for supporting two groups of panes, each pane being supported at an angle to the direction of travel of the carriage; a plurality of edge-treating assemblies, each adapted to operate simultaneously with the others on a single pane; common means for supporting said assemblies between said end frames and for progressing them along exposed edges of the panes; and means for moving the carriage on the base to bring one group of panes into operative position between the end frames while moving the other group of panes to a second position at one side of both end frames.

7. In a device for rounding the edges of a plurality of panes of glass or the like, the combination of a pair of longitudinally spaced end frames, at least one end frame being provided with a central opening, a carriage mounted for longitudinal movement through said opening, releasable means on the carriage for supporting a group of panes thereon at right angles to the direction of travel of the carriage, and in longitudinally spaced relationship, a plurality of grinder wheel assemblies, each having a grooved abrasive wheel adapted to contact the edges of a single pane; and common means for supporting said assemblies between said end frames and for simultaneously progressing them along exposed edges of the panes.

8. In a device for rounding the edges of a plurality of panes of glass or the like, the combination of a pair of longitudinally spaced end frames, at least one end frame being provided with a central opening, a carriage mounted for longitudinal movement through said opening, releasable means on the carriage for supporting a group of panes theron at right angles to the direction of travel of the carriage, and in longitudinally spaced relationship, a plurality of grinder wheel assemblies, each having a grooved abrasive wheel adapted to contact the edges of a single pane; common means for supporting said assemblies between said end frames and for simultaneously progressing them along exposed edges of the panes; said means including a power-driven endless flexible element on each of the end frames constrained to move in a predetermined path.

9. In a device for rounding the edges of a plurality of panes of glass or the like, the combination of a base; a pair of end frames on the base, each having a central opening; a carriage mounted for longitudinal movement on the base and adapted to move through said openings; releasable means on the carriage for supporting a group of panes at right angles to the direction of travel of the carriage, and in longitudinally spaced relationship; a plurality of grinder wheel assemblies, each adapted to operate on one of said panes; common means for supporting said assemblies between said end frames; a power-driven endless flexible element on each of the end frames and constrained to move in a predetermined path around the opening therein; said common support means being carried on said flexible element whereby the grinder wheel assemblies may be progressed along the exposed edges of the panes.

10. In a device for rounding the edges of a pane of glass or the like, the combination of a movable support; an edge-treating assembly carried on said support; means for progressing the support relative to a pane of glass so that the edge-treating assembly may round the exposed edges of the glass pane, said means including an endless flexible element constrained to move in a predetermined path having parallel sections; a movable member having guide means for a portion of the length of the path of said endless flexible element between said sections; and means for moving said member in a direction parallel to said sections to shorten one section and lengthen the other whereby the path of travel of the support member and edge-treating assembly may be varied to conform to glass panes of various sizes.

11. In a device for rounding the edges of a pane of glass or the like, the combination of a movable support; a grinder wheel assembly carried on said support; means for progressing the support relative to a pane of glass so that the grinder wheel assembly may round the exposed edges of the glass pane, said means including an endless flexible element constrained to move in a predetermined path; a movable member having guide means for a portion of the length of the path of said endless flexible element, said member being positioned between parallel flights of said elements; and means for moving said member in a direction parallel to said flights to shorten one flight and lengthen the other whereby the path of travel of the support member and grinder wheel assembly may be varied to conform to glass panes of various sizes.

12. In a device for rounding the edges of a plurality of panes of glass or the like, the combination of: a carriage supporting the panes in spaced relationship; a movable support; a plurality of grinder wheel assemblies carried on said support; means for progressing the support relative to the panes of glass so that the grinder wheel assemblies may round the exposed edges of the glass panes, said means including an endless chain at each end of the support constrained to move in a predetermined path; a movable adjustment member for each chain having guide means for a portion of the length of the path of said chain, each of said adjustment members being positioned between parallel flights of said chain; and means for moving each member in a direction parallel to said flights to shorten one flight and lengthen the other whereby the path of travel of the support member and grinder wheel assemblies may be varied to conform to glass panes of various lengths.

13. In a device for rounding the edges of a plurality of panes of glass or the like, the combination of a pair of longitudinally spaced end frames, at least one end frame being provided with a central opening, a carriage mounted for longitudinal movement through said opening, releasable means on the carriage for supporting a group of panes thereon at an angle to the direction of travel of the carriage, and in longitudinally spaced relationship, a plurality of grinder wheel assemblies, each having a grooved abrasive wheel adapted to contact the edges of a single pane, common means for supporting said assemblies between said end frames and for simultaneously progressing them along exposed edges of the panes, said means including an endless flexible element constrained to move in a predetermined path having parallel sections, a movable member having guide means for a portion of the length of the path of said endless flexible element between said sections, and means for moving said member in a direction parallel to said sections to shorten one section and lengthen the other whereby the path of travel of the support member and edge-treating assembly may be varied to conform to glass panes of various sizes.

KARL A. WEBER.

REFERENCES CITED

The following references are of record in the file of this patent:

UNITED STATES PATENTS

| Number | Name | Date |
| --- | --- | --- |
| 1,484,867 | Bradley | Feb. 26, 1924 |
| 1,986,520 | Oakley | Jan. 1, 1935 |
| 1,986,521 | Oakley | Jan. 1, 1935 |
| 2,057,174 | Weber | Oct. 13, 1936 |
| 2,215,692 | Fleming | Sept. 24, 1940 |
| 2,252,879 | Calame | Aug. 19, 1941 |
| 2,262,049 | Robinson | Nov. 11, 1941 |
| 2,328,350 | Lindemeyer | Aug. 31, 1943 |
| 2,375,333 | Troendly et al. | May 8, 1945 |
| 2,433,464 | La Plante | Dec. 30, 1947 |